United States Patent
Tamura et al.

(10) Patent No.: US 6,200,692 B1
(45) Date of Patent: *Mar. 13, 2001

(54) CONTAINER FOR HOLDING HIGH PURITY ISOPROPYL ALCOHOL

(75) Inventors: Seiji Tamura; Hiroyuki Mishima, both of Tokuyama (JP)

(73) Assignee: Tokuyama Corporation, Tamaguchi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,028

(22) Filed: Mar. 20, 1998

(30) Foreign Application Priority Data

| Mar. 21, 1997 | (JP) | 9-068536 |
| Sep. 22, 1997 | (JP) | 9-256526 |
| Feb. 23, 1998 | (JP) | 10-040312 |

(51) Int. Cl.$^7$ .......................... B65D 25/14; B65D 85/86; C23C 30/00
(52) U.S. Cl. .................. 428/629; 428/679; 427/405; 427/419.2; 205/171; 220/62.15; 220/62.17; 220/4.12; 220/917
(58) Field of Search .................. 428/679, 680, 428/935, 936, 629, 34.4; 220/4.12, 4.14, 62.17, 901, 917, 62.15; 427/405, 419.2, 438; 205/271, 131, 171, 333; 206/524.3, 524.5

(56) References Cited

U.S. PATENT DOCUMENTS

| 3,245,885 | 4/1966 | Asano et al. ............................. 204/35 |
| 3,893,601 | 7/1975 | Winslow ................................ 222/566 |
| 4,035,248 | 7/1977 | Asano et al. ........................ 204/38 B |
| 4,072,243 | * 2/1978 | Conant et al. ....................... 215/12 R |
| 4,125,640 | * 11/1978 | Conant et al. ........................ 427/250 |
| 4,125,642 | * 11/1978 | Petit et al. ................................. 427/8 |
| 4,461,679 | 7/1984 | Higuchi et al. ......................... 204/27 |
| 4,696,724 | 9/1987 | Deguchi et al. ........................ 204/27 |
| 4,825,007 | * 4/1989 | Konai et al. ........................... 568/815 |
| 5,149,566 | * 9/1992 | Morton et al. ........................ 427/235 |
| 5,513,198 | * 4/1996 | Jakobson ................................. 372/43 |

FOREIGN PATENT DOCUMENTS

| 2350809 | 4/1975 | (DE) . |
| 0339578 | 11/1989 | (EP) . |
| 2079319 | 1/1982 | (GB) . |
| 2179876 | 3/1987 | (GB) . |
| 61-266596 | 11/1986 | (JP) . |
| 06116749 | 4/1994 | (JP) . |
| 06304064 | 11/1994 | (JP) . |

OTHER PUBLICATIONS

WPI Accession No. 95–018299/03 & JP 6304064 A (ARITA)—Abstract No Date.

WPI Accession No. 94–174157/21 & 6116749 A (USUI)—Abstract No Date.

WPI Accession No. 87–010115/02 & JP 61266596 A (Nippon)—Abstract No Date.

* cited by examiner

*Primary Examiner*—John J. Zimmerman

(57) ABSTRACT

The present invention relates to a container for holding high purity isopropyl alcohol (IPA) used in the electronic industry, which extremely dislike the inclusion of metal impurities. The container made of metal for holding high purity IPA, wherein at least the inside surface layer of the container is composed of nickel.

11 Claims, 1 Drawing Sheet

CONTAINER FOR HOLDING HIGH PURITY ISOPROPYL ALCOHOL

BACKGROUND OF THE INVENTION

The present invention relates to a container for holding high purity isopropyl alcohol (IPA) used in the electronic industry such as the production of semiconductors and the production of liquid crystals which extremely dislike the inclusion of metal impurities. More specifically, the present invention relates to a container for holding high purity IPA even after the high purity isopropyl alcohol is stored for a long period of time, the total amount of metal dissolved can be suppressed below 10 pg/ml (ppt) based on the high purity IPA.

The quality of a container for holding IPA used in the electronic industry is generally a glass or plastics in the case of containers of small capacity, whereas in the case of medium to large containers having a capacity of at least 10 liters, stainless steel is generally used by considering strength-safety.

In the electronic industry, especially in the semiconductor industry, with an abrupt technical innovation of a miniaturization of the form pattern size and the increase of the diameter of a substrate, high purities are required in IPA and other chemicals used for washing and drying, and the amounts of these chemicals to be handled are increasing.

When a large quantity of IPA is handled, a metallic container such as stainless steel is ordinarily used as a container for holding IPA. However, when IPA has a high purity, the contamination of IPA by a metal dissolved from the metallic container poses a problem in a state of being stored in the holding container.

Especially, in the production of semiconductors in recent years, with the miniaturization of the device, conditions against the contents of metallic impurities (including a mist or a particle) in IPA used become rigorous, and when IPA is stored in a holding container for a long time, the holding container in which the total amount of metal impurites dissolved in high purity IPA should be 10 pg/ml (ppt) or below is required.

Conventionally, in order to prevent the dissolving of metal impurities from the surface of stainless steel, methods of polishing the surface of the stainless steel to make the surface smooth, for example a method of performing buffing polishing or electrolytic polishing, have been disclosed. Furthermore, Japanese Laid-Open Patent Publication No. 268599/1995 discloses subjecting the surface of a stainless steel to electrolytic polishing, carrying out heat-treatment at a high temperature, and forming a colored oxide coating on a finished surface.

However, when a stainless steel is subjected to a polishing treatment (buffing polishing and electrolytic polishing), the treated product contains the amount of a metal dissolved to a level of ppm to ppb, and the attained level does not satisfy the desired target in the present invention.

Furthermore, the method comprising electrolytic polishing stainless steel, performing heat-treatment at a high temperature and forming a colored oxide coating on a finished surface gives an extremely small amount of metal dissolved, but when the dissolving of the metal is suppressed to a very low level, the electrolytic polishing treatment is required to have a high accuracy, and furthermore, the treatment takes much time and labor. Furthermore, it is difficult to apply the above method to metal containers other than stainless steel.

SUMMARY OF THE INVENTION

Accordingly, it is an object of the present invention to provide a container for holding high purity IPA wherein when high purity IPA is contained and stored for a long period of time, the amounts of metals dissolved in the inside of the container are suppressed so that the purity of high purity IPA may hardly be lowered.

The above object can be achieved by constructing at least the inner surface of a metallic container with a nickel layer.

Thus, according to the present invention, there is provided a container for holding high purity isopropyl alcohol wherein at least the inner layer of the container is constructed with nickel.

Figure 1:
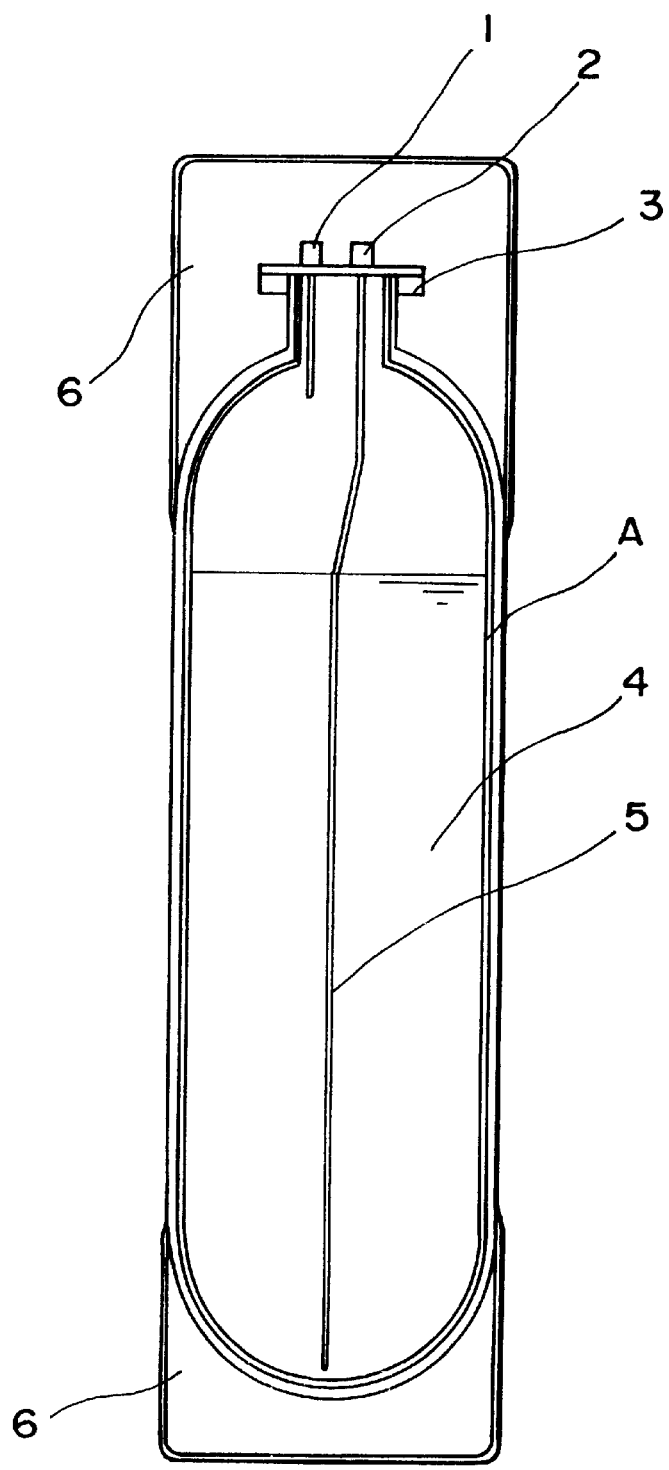
FIG. 1 is a rough view showing the structure of a typical example of a container for holding high purity IPA in accordance with the present invention.

In the drawing, 1 represents a coupler for a gas, 2 represents a coupler for IPA, 3 represents a flange, 4 represents isopropyl alcohol, 5 represents a pipe, 6 represents a skirt, and A represents a nickel plated layer.

DETAILED DESCRIPTION OF THE INVENTION

The container for holding IPA according to the present invention (to be simply referred to as a holding container) is characterized in that a portion which contacts IPA to be held, namely at least the inside layer, is composed of nickel. This characteristic is very important in maintaining the purity of IPA held in the container on a high level.

Japanese Patent Publication No. 63619/1988 shows that in an apparatus for producing IPA using a catalyst of a heteropolyacid ion under severe conditions including a high temperature and a high pressure, the apparatus is lined with gold, platinum, or silver in order to prevent the decomposition of metals by the catalyst, and the apparatus is constructed with special metallic materials such as nickel, chromium, zirconium, tantalum and titanium.

However, the above patent document discloses materials which prevent the decomposition action of metals by a heteropolyacid ion in a system containing heteropolyacid ion, water and alcohol. However, the above patent document does not at all disclose that the catalyst, etc. are removed from the above-mentioned system, purification is carried out, the resulting high purity IPA is held in a metallic container and a metal will be dissolved by the contacting of IPA with the metal; the inside layer of the metallic container is constructed with nickel; and due to the above construction, the amounts of the metals dissolved in IPA are markedly lowered.

Specific embodiments of constructing the inner surface layer of the metallic container with nickel in the present invention will be illustrated. These embodiments are an embodiment wherein the container is constructed with any metal other than nickel, and its inside surface is formed of a layer composed of nickel, and an embodiment wherein the total thickness of the container is constructed with nickel. Of these embodiments, the embodiment in which the inner surface is formed of nickel is preferred because a metal other than nickel may be used, the structural strength of the container can be increased, and this embodiment is economical in that the amount of expensive nickel can be decreased.

The method of producing a container whose inner surface layer is composed of nickel will be specifically described.

An inner cylinder is constructed with nickel, and a multi-cylinder system in which at least one cylinder outside the inner cylinder is constructed with an arbitrary metal such as stainless steel, copper, iron, and aluminum is produced. The above multi-cylinder system is molded and fabricated into a desired container shape by known methods. There is a method of forming a nickel plating layer on an inside layer by applying a nickel plating layer to the inside surface of a metallic container. Among these embodiments, the embodiment of forming a nickel plating layer is most preferred in the purity of the surface layer and the surface condition because the dissolving of the metals can be prevented to a high degree.

A method of producing a container whose entire layer is composed of nickel will be shown specifically. Specifically, it is a method of molding a nickel plate or a nickel tube into the shape of a container by a known technique and processing the resulting product.

In the embodiment of forming the nickel plated layer, the quality of the metallic container may be any metal having intimate adhesiveness to the nickel plated layer. With respect to the strength, metals such as stainless steel, copper, iron and aluminum are especially preferred.

The embodiment of applying a nickel plated layer may be applied when the the entire layer of the metallic container is composed of nickel. In this case, it is advantageous that nickel on the surface layer can be purified to a higher degree.

In applying a nickel plated layer, the inner surface of the metallic container may be treated by electrolytic polishing in order to increase intimate adhesiveness to the nickel plated layer, and to increase the durability of the plated layer. Any known method of the electrolytic polishing may be employed without any problem.

For example, in the case of stainless steel, it is general to employ a mixed acid-type, namely a mixture of phosphoric acid and sulfuric acid, a temperature of 50 to 80° C., a current density of 2 to 10 A/dm$^2$ and a treating time of 5 to 30 minutes.

In the present invention, without especially managing the surface accuracy of a metallic container by electrolytic polishing, the dissolving of metal ions at the time of containing IPA by the nickel plated layer can be suppressed very highly.

The method of forming the nickel plated layer may be any conventional nickel plating technique without any limitation. For example, electrolysis plating and electroless plating may be cited. The employment of electrolysis plating is preferred in view of the intimate adhesiveness to the mother material and the purity of nickel in the formed plated layer. Furthermore, in order to increase the intimate adhesiveness, a multi-layer plating method using a combination of two plating methods is preferred.

In order to strengthen the intimate adhesiveness between the metallic container and the plated layer and increase the durability, it is preferred to apply a strike nickel treatment to the inside surface of the container before a nickel plating is applied. For such a strike nickel treatment, any known method may be employed without any particular problem. For example, in the case of stainless steel, it is general to use a mixed solution of nickel chloride and hydrochloric acid, a temperature of 15 to 25° C., a current density of 5 to 15 A/dm$^2$ and a treating time of 3 to 10 minutes.

By combining the above strike nickel treatment with the above electrolytic polishing treatment, it is possible to impart a very high durability to the formed nickel plated layer.

The thickness of the nickel plated layer formed by the above method is not particularly limited, but may suitably be 0.5 to 50 $\mu$m, preferably 1 to 20 $\mu$m. When the thickness is thinner than 0.5 $\mu$m, if a metal other than nickel exists as a mother material being a foundation which constitutes a metallic container, it is feared that impurities of the metal may be dissolved. When the thickness of the nickel plated layer is thicker than 50 $\mu$m, it is not economical. Also, it is feared that defects such as cracks may form in the nickel plated layer, and in the same way as above, and the metal impurities may be dissolved from the cracks and the mother material as a foundation.

In the present invention, nickel constituting the inside surface layer may have a purity of at least 99% by weight, preferably at least 99.5% by weight. When the purity of nickel is less than 99% by weight, a contamination of IPA by the dissolving of impurties in the nickel may poses a problem. Especially, the contents of iron, chromium and copper as impurity metals in the nickel are desirably suppressed to 1000 ppm or less, preferably 500 ppm or less, especially 200 ppm or less.

The formation of the nickel plated layer is extremely advantageous to form an inside surface layer having the above purity. When the strength of the container for holding IPA is considered, it is preferred to use a metallic container having a material with a high strength such as stainless steel.

Accordingly, the most preferred embodiment in the present invention is an embodiment in which a nickel plated layer is formed on the inner surface of a metallic container of a material having high strength such as stainless steel.

In the present invention, as stated above, by constructing a metallic container wherein at least inner surface layer is composed of nickel, any metal is hardly dissolved out, and it is possible to produce a container for holding high purity IPA. Even when high purity IPA is preserved for a long period of time in the container, the purity of high purity IPA is not decreased. By subjecting the surface of the inside surface layer composed of nickel to an oxidation treatment to form an oxide coating, the dissolving of such metals can be further decreased.

According to the present invention, there is provided a container for holding high purity isopropyl alcohol wherein at least inside surface layer of the container is composed of nickel, and the surface of the inside surface layer of the container has an oxide coating of the nickel.

In the present invention, the method of forming an oxide coating of nickel on the surface of the above-mentioned inside surface composed of nickel may be any conventional oxidation treating method without limitation. For example, a method of treating the surface of the inner surface layer of a metallic container by a heat oxidation method, an anodic oxidation method utilizing an electrolysis reaction, or a chemical oxidation method by using an oxidizing agent may be cited. Of these methods, methods of treatment by a heat oxidation method or an anodic oxidation method are preferred in respect of the durability and the elaborateness of the formed oxide coating and the uniformity of thickness of the oxide coating.

In the case of the heat oxidation treatment, the treatment is generally carried out under conditions, for example, in the atmosphere, at a temperature of 200 to 400° C., and for a treating time of 1 to 4 hours.

In the case of the anodic oxidation method, the treatment is generally carried out, for example, in an alkali solution at a current density of 5 to 20 A/dm$^2$ for a treating time of 5 to 30 minutes.

The thickness of the nickel oxide coating formed in by the above method is generally at least 50 Å. In this regard, the above coating can be distinguished from a native oxide coating formed inevitably on the surface of nickel.

In the present invention, the suitable thickness of the oxide coating of nickel is 50 to 400 Å, preferably 100 to 300 Å. If the thickness of the oxide coating is smaller than 50Å, the dissolving out of the metal impurity in the alcohol tends to become difficult to maintain at a level desired in the present invention. Furthermore, if the thickness of the oxide coating is larger than 400 Å, it is not economical and it is feared that defects such as cracks will be formed in the oxide coating.

The container for holding IPA of the present invention is effective for IPA having a superior quality of high purity IPA to be supplied and preserved to and in the container. Generally, the container is markedly effective to the purity of IPA immediately before being held, which is not smaller than four-nine (99.99%) with a water concentration of 50 ppm or below.

The structure of the container for holding IPA of the present invention is not particularly limited. However, the structure shown in FIG. 1 is preferred in order to prevent the inclusion of impurities at the time of supplying and taking out IPA, and to maintain the quality of IPA.

A coupler 1 for a gas and a coupler 2 for a liquid are fitted in an opening portion of a container having a plated layer A in the inner surface desirably to make a hermetically closed structure. Each coupler is composed of a coupler (not shown) separately provided on the pipe side, and a pair of a male and a female, and when both are connected to each other, a liquid flowing state is obtained, and when both are separated from each other, a closed state results as in a known structure. Since by this connecting operation, the IPA in the container does not contact the outer air, exterior contamination does not occur. The above structure may preferably be used in the present invention.

The holdable capacity of the container for holding IPA of the present invention is not particularly limited. However, when the capacity of the container is at least 10 liters in consideration of economy, the effect of the present invention appears especially markedly.

In the present invention, it is preferred to form roundness (curvature) near the bottom portion and the opening portion of the container for holding IPA. This is for the purpose of increasing the intimate adhesiveness to the nickel plated layer, increasing the mechanical strength, and imparting complete liquid detachment of IPA in the container. In addition, to prevent falling of the container, or to protect the outer surface of the container, it is preferred to provide an embodiment in which the skirt 6 is installed outside the bottom portion and the opening portion.

Generally, in the case of requiring a very high purity of IPA, if IPA is supplied to an opened container or if IPA is dispensed from the container impurities in the atmosphere will be rapidly taken into IPA to contaminate IPA. Accordingly, an abrupt decrease of the purity cannot be avoided. Such a decrease in purity often becomes a trouble at the time of producing semiconductors.

To prevent this trouble, when IPA is supplied to a container for holding IPA, a method is preferred in which IPA produced in the plant is supplied via a coupler 2 for IPA, and from the coupler 1 for a gas, the gas in the inside of the container is exhausted. Furthermore, when IPA held in the container is supplied from the IPA holding container to a point-of-use, a method is widely used which comprises supplying an inert gas such as nitrogen and argon gas via the coupler 1 for a gas to pressurize the inside portion of the IPA holding container, and thereafter supplying IPA into a pipe via the IPA coupler 2 without contacting with the atmosphere. In this case, the pipe 5 for withdrawing and the couplers which contact IPA are nickel-plated. However, these devices are preferably constructed with a material which does not dissolve the metal in order to prevent a lowering of purity of IPA.

Prior to using, the IPA holding container of the present invention is desirably precisely washed in the inner portion of the container. If the washing of the container is insufficient, the soilings on the inner surface dissolve in IPA, and the purity attained by the present invention cannot be maintained. Examples of the washing step are shown in the following. It is very effective to combine a degreasing and washing using solvents, washing with aqueous detergents, water washing with super pure water, and washing with IPA. A washing solution may be heated in each washing step and a ultrasonic or megasonic wave washing may be added to each washing step.

EFFECT OF THE INVENTION

As can be understood from the foregoing description, since at least the inner surface of the holding container of the present invention is composed of a nickel layer, the dissolving out of metal impurities in IPA is suppressed very highly. Hence, even when high purity IPA is preserved for a long period of time in the holding container, the purity and quality of IPA can be maintained in a good state. As a result, a trouble in the production of semiconductors and in the production of liquid crystal display devices, which is due to the increase of metal concentrations in IPA, can be avoided. Accordingly, we will be able to make a contribution to the increasing the yield of the product, and further to stable operating in the above steps.

When the surface layer portion of the nickel layer constituting the inner surface is subjected to an oxidization treatment, the dissolving out of metal impurities in IPA can be suppressed more highly. Even when high purity IPA is kept for a long period of time, the purity and quality of IPA can be maintained in a good state, and the above effect can further be increased.

EXAMPLES

Examples and Comparative Examples are given below to describe the details of the present invention, but the invention should not be limited to these examples.

In the following examples, metal ions in IPA gave values analyzed by ICP-MS (inductively coupled plasma-mass spectrometer).

Furthermore, impurity concentrations in metals gave values analyzed by ICP (inductively coupled plasma spectroanalyzer).

Example 1

A metallic container having a can diameter of 250 mm and a length of 650 mm composed of a SUS 304 stainless steel with a can bottom portion and an opening portion having a curvature of 125 mm was prepared. Then, an inside surface of this container was electroplated in a plating bath composed mainly of nickel sulfate at an electrolytic current density of 4 A/dm$^2$ to give a container for holding high purity IPA on the surface of which a nickel plated layer having a thickness of 20 μm was formed.

When the nickel plated layer was analyzed, the purity of nickel was at least 99.99% and the contents of iron, chromium and copper were 100 ppm or less.

Thereafter, the above holding container was precisely washed with super-pure water having a resistivity of at least 18 MΩ·cm, and then was precisely washed with high purity IPA having a resistivity of at least 1000 MΩ·cm.

The so obtained container for holding high purity IPA was filled with high purity IPA (having a purity of at least 99.99%), and the IPA was held at room temperature for 6 months. Thereafter, metal ions dissolved in IPA in the container were analyzed. The results are shown in Table 1.

Example 2

A metallic container having the same size and shape as in Example 1 was produced from industrial pure nickel, and a nickel plated layer was not formed in the above container to give a container for holding high purity IPA.

When the inside surface of the resulting container was analyzed, the purity of nickel was 99%, and the contents of iron, chromium and copper were 500 ppm.

Thereafter, the resulting container was washed in the same way as in Example 1, filled with high purity IPA having the same purity as in Example 1, and IPA was held at room temperature for 6 months. Then, the metal ions dissolved in IPA were analyzed. The results were shown in Table 1.

Comparative Example 1

A metallic container having the same size and shape as in Example 1 and composed of SUS 304 stainless steel was produced. The inside surface of the metallic container was subjected to electrolytic polishing with an electrolytic polishing solution of the phosphoric acid-sulfuric acid type at an electrolytic current density of 10 A/dm² to give a holding container for IPA.

Thereafter, the holding container was washed in the same manner as in Example 1, filled with high purity IPA having the same purity as in Example 1, and IPA was held at room temperature for 6 months. Then, metal ions dissolved in IPA were analyzed. The results are shown in Table 1.

Comparative Example 2

In Example 1, instead of the nickel plated layer, electroplating was carried out in the same way as in Example 1 except that the container was electroplated in a plating bath containing chromic acid as a main component at an electrolytic current density of 30 A/dm². As a result, a container for holding IPA on the inside surface of which a chromium plated layer having a thickness of 50 μm was formed was obtained.

Then, the holding container was washed in the same way as in Example 1, and filled with high purity IPA having the same purity as in Example 1, and IPA was held at room temperature for 6 months. Thereafter, metal ions dissolved in IPA were analyzed. The results are shown in Table 1.

TABLE 1

| | Metal ion concentrations (ppt) | | | | |
|---|---|---|---|---|---|
| | Fe | Cr | Ni | Cu | Total amount dissolved |
| Example 1 | 3 | 1 | 1 | 1 | 6 |
| Example 2 | 6 | 1 | 2 | 1 | 10 |
| Com. Ex. 1 | 120 | 479 | 49 | 89 | 737 |
| Com. Ex. 2 | 145 | 2348 | 121 | 245 | 2859 |

Example 3

A metallic container having the same size and shape as in Example 1 and composed of SUS 304 stainless steel was produced. Its inside surface was electrolytically polished, subjected to a strike nickel treatment, and elctroplated under the same conditions as in Example 1 to form a nickel plated layer to give a container for holding high purity IPA.

The above electrolytic polishing was carried out in a mixed acid of a mixture of phosphoric acid and sulfuric acid for 10 minutes at a current density of 5 A/dm². The above strike nickel treatment was carried out in a nickel chloride and hydrochloric acid at a current density of 10 A/dm² for 5 minutes.

The nickel plated layer as the inside surface of the resulting container for holding high purity IPA was analyzed. The results were the same as in Example 1.

Containers for holding high purity IPA were produced in four series in which one series contained 5 containers. With each series, the same washing operation as in Example 1 was performed by changing the times of the washing operation from 1 to 10, 20, and 30 times. After the above performance, high purity IPA was filled in the containers, and the durability of each container holding high purity IPA was examined. With regard to containers for holding high purity IPA in each series, IPA was held for 6 months at room temperature, and thereafter, the metal ions dissolved in IPA were analyzed. An average value was found with each series. The results are shown in Table 2.

After the completion of the test, the inside surface of each container was checked by visual observation. Even when a number of washing operations were repeatedly carried out, cracks or peeled portions were not observed at all in the plated layer. It was confirmed that the containers showed excellent durability.

TABLE 2

| | Metal ion concentrations (ppt) | | | | |
|---|---|---|---|---|---|
| Washing times | Fe | Cr | Ni | Cu | Total amount dissolved |
| 1 | 3 | 1 | 1 | 1 | 6 |
| 10 | 5 | 1 | 2 | 1 | 9 |
| 20 | 4 | 1 | 2 | 2 | 9 |
| 30 | 5 | 1 | 2 | 2 | 10 |

Example 4

A container for holding IPA having a diameter of 250 mm and a length of 650 mm and composed of SUS 304 stainless steel with a bottom portion and an opening portion having a curvature of 125 mm was produced and electrolytically polished and subjected to a strike nickel treatment. The container was electrolytically plated in a plating bath containing nickel sulfate as a main component at an electrolytical current density of 4 A/dm² to obtain a container for holding IPA on the surface of which a plated layer having a thickness of 20 μm was formed.

When the nickel plated layer as the inner surface of the resulting container for holding high purity IPA was analyzed, the purity of nickel was at least 99.99%, and the total content of iron, chromium and copper was 100 ppm or below.

Thereafter, the above nickel plated layer was heated and oxidized at 400° C. for 3 hours in the atmosphere to form an oxide coating having a thickness of 300 Å on the nickel plated layer.

The resulting holding container was precisely washed with superpure water having a resistivity of at least 18 MΩ·cm, and further precisely washed with high purity IPA having a resistivity of at least 1000 MΩ·cm.

Thereafter, this holding container was filled with high purity IPA (having a purity of at least 99.99%), and the IPA was held at a temperature of 50° C. for 6 months. Then, the metal ions dissolved in IPA in the container for holding IPA were analyzed. The results are shown in Table 3.

Example 5

The same procedure as in Example 4 was repeated to produce a container for holding high purity IPA except that the oxide coating was formed by performing electrolytic oxidation treatment in a sodium hydroxide solution at a temperature of 80° C. at a current density of 5 A/dm² for 30 minutes.

When the inner surface of the holding container was analyzed, the thickness of the oxidation-treated layer was 150 Å.

The holding container was washed in the same way as in Example 4, and was filled with high purity IPA having the same purity as in Example 4. IPA was preserved in the container at a temperature of 50° C. for 6 months, and thereafter, the metal ions dissolved in IPA were analyzed. The results are shown in Table 3.

TABLE 3

| | Metal ion concentrations (ppt) | | | | |
| --- | --- | --- | --- | --- | --- |
| | Fe | Cr | Ni | Cu | Total amount dissolved |
| Example 4 | 2 | 2 | 1 | 1 | 8 |
| Example 5 | 5 | 2 | 2 | 1 | 10 |

Example 6

A metallic container having the same size and shape as in Example 4 and composed of SUS 304 stainless steel was produced, and its inside surface was electrolytically polished and subjected to a strike nickel treatment and nickel plating under the same conditions as in Example 4. The resulting nickel plated layer was subjected to electrolytical oxidation treatment under the same conditions as in Example 5. After the electrolytical oxidation treatment, the inside surface of the holding container was analyzed. The same results as obtained in Example 5 were given.

Containers for holding high purity IPA were produced in four series in which one series contained 5 containers. With each series, the same washing operation as in Example 4 was performed by changing the times of the washing operation from 1 to 10, 20 and 30 times. After the above performance, high purity IPA was filled in the containers, and the durability of each container holding high purity IPA was examined. With regard to containers for holding high purity IPA in each series, IPA was held for 6 months at a temperature of 50° C., and thereafter the metal ions dissolved in IPA were analyzed. An average value was found with each series. The results are shown in Table 4.

After the completion of the test, the inside surface of each container was checked by visual observation. Even when a number of washing operations were repeatedly carried out, cracks or peeled portions were not observed at all in the plated layer. It was confirmed that the containers showed excellent durability.

TABLE 4

| | Metal ion concentrations (ppt) | | | | |
| --- | --- | --- | --- | --- | --- |
| Washing times | Fe | Cr | Ni | Cu | Total amount dissolved |
| 1 | 4 | 2 | 2 | 1 | 9 |
| 10 | 3 | 2 | 1 | 2 | 8 |
| 20 | 3 | 2 | 2 | 2 | 9 |
| 30 | 4 | 2 | 2 | 2 | 10 |

What is claimed is:

1. A container made of metal for holding high purity isopropyl alcohol having a purity of not smaller than 99.99% by weight with a water concentration of 50 ppm by weight or below,
    wherein said container has a nickel layer of 0.5 to 50 μm thick having a nickel purity of at least 99% by weight and containing less than 1000 ppm by weight in total of iron, chromium and copper, plated on an inside wall substrate, and on said nickel plated layer, a coating layer of nickel oxide having a thickness of 50 to 400 Å is formed, as an inner-most surface layer, covering over said nickel layer.

2. A container for holding high purity isopropyl alcohol according to claim 1,
    wherein said container has a hermetically closed structure and has a coupler for a gas and a liquid fitted in an opening portion thereof, each being able to connect to a corresponding pipe line side coupler so as to avoid contamination with outer air in flowing state.

3. A container for holding high purity isopropyl alcohol according to claim 2,
    wherein said container is formed roundness near the bottom portion and the opening portion thereof.

4. A container for holding high purity isopropyl alcohol according to claim 1 wherein the purity of nickel constituting the inside surface layer is at least 99.5% by weight.

5. A container for holding high purity isopropyl alcohol according to claim 1 wherein the inside surface of the container for forming a nickel plated layer is electrolytically polished, prior to nickel plating the inside surface.

6. A container for holding high purity isopropyl alcohol according to claim 1 wherein the nickel plated layer is formed by subjecting the inside surface of the container to a strike nickel treatment and thereafter electrolytically plating the treated nickel plated layer with nickel and/or electroless plating the treated nickel plated layer with nickel.

7. A container for holding high purity isopropyl alcohol according to claim 5 wherein the nickel plated layer is formed by subjecting the inside surface of the container to a strike nickel treatment and thereafter electrolytically plating the treated nickel plated layer with nickel and/or electroless plating the treated nickel plated layer with nickel.

8. A method for holding high purity isopropyl alcohol by packing it in a metal container having a nickel metal layer formed on inner side wall substrate thereof, wherein said isopropyl alcohol has a purity at least 99.99% by weight with a water concentration of 50 ppm by weight or below, and said nickel metal layer has a thickness of 0.5 to 50 μm and has a nickel purity of at least 99% by weight with an iron, chromium and copper content of less than 1000 ppm by weight in total, and wherein on said nickel layer, a coating layer of nickel oxide having a thickness of 50 to 400 Å is formed, as an inner-most surface layer, covering over the nickel metal layer.

9. A method for holding high purity isopropyl alcohol according to claim 8, wherein said high purity isopropyl alcohol is for semiconductors processing or liquid crystals processing use.

10. A container made of metal containing high purity isopropyl alcohol having a purity of not smaller than 99.99% by weight with a water concentration of 50 ppm by weight or below, wherein said container has a nickel layer of 0.5 to 50 μm thick having a nickel purity of at least 99% by weight and containing less than 1000 ppm by weight in total of iron, chromium and copper, plated on an inside wall substrate, and on said nickel plated layer, a coating layer of nickel oxide having a thickness of 50 to 400 Å is formed, as an inner-most surface layer, covering of said nickel layer.

11. A container containing high purity isopropyl alcohol according to claim 10, wherein said container has a hermetically closed structure and has a coupler for a gas and a liquid fitted in an opening portion thereof, each being above to connect to a corresponding pipe line side coupler so as to avoid contamination with outer air in flowing state.

* * * * *